United States Patent [19]

Gospodar

[11] 4,290,323

[45] Sep. 22, 1981

[54] APPARATUS FOR CONTROLLING THE CLOSING LIMIT OF A CARBURETOR THROTTLE VALVE

[76] Inventor: Reinhard Gospodar, Eichelkamp 36, 3180 Wolfsburg, Fed. Rep. of Germany

[21] Appl. No.: 55,819

[22] Filed: Jul. 9, 1979

Related U.S. Application Data

[63] Continuation of Ser. No. 788,029, Apr. 15, 1977, abandoned.

[30] Foreign Application Priority Data

Apr. 22, 1976 [DE] Fed. Rep. of Germany ....... 2617560

[51] Int. Cl.³ ....................... B60K 21/00; B60K 23/00

[52] U.S. Cl. ....................................... 74/860; 74/372; 74/873

[58] Field of Search ................. 74/860, 857, 872, 873, 74/858, 851; 123/103 R, 148 E; 251/132

[56] References Cited

U.S. PATENT DOCUMENTS 2,944,126 7/1960 Shewmon et al. .............. 251/132 X
3,707,892 1/1973 Kuroda et al. ........................ 74/873
3,756,208 9/1973 Toda et al. ....................... 74/872 X

FOREIGN PATENT DOCUMENTS 2046436 6/1971 Fed. Rep. of Germany .

*Primary Examiner*—C. J. Husar
*Assistant Examiner*—Frank McKenzie

[57] ABSTRACT

Apparatus for controlling the closing limit of a carburetor throttle valve in a motor vehicle engine. The apparatus comprises a vacuum-actuated device for varying the closing limit of the throttle valve in dependence upon the vacuum applied thereto; a vacuum line connecting the vacuum-actuated device with a source of intake manifold vacuum downstream of the throttle valve; a solenoid valve arranged in the vacuum line for controlling the vacuum transmitted by the line; and an electrical circuit for controlling the solenoid valve in dependence upon the gear shift position of the vehicle transmission.

7 Claims, 2 Drawing Figures

APPARATUS FOR CONTROLLING THE CLOSING LIMIT OF A CARBURETOR THROTTLE VALVE

This is a continuation of application Ser. No. 788,029, now abandoned, filed Apr. 15, 1977.

BACKGROUND OF THE INVENTION

The present invention concerns apparatus for controlling a vacuum-actuated device which provides a continual adjustment of the closing limit of a carburetor throttle valve of a motor vehicle engine; specifically, an internal combustion engine of the type in which a fuel-air mixture is supplied to the engine intake manifold. More particularly, the invention relates to apparatus for controlling a valve, such as a solenoid valve, arranged in the vacuum line extending from the intake pipe or manifold of the engine to this closing adjustment mechanism.

In order to decrease the emission of noxious substances during deceleration operation of motor vehicle (automobile) engines of the aforementioned type, a technique is known whereby the carburetor throttle valve is opened sufficiently widely, during this operating state, to supply an adequate quantity of air for combustion of the fuel which reaches the combustion chambers. This throttle valve position is customarily achieved by means of a vacuum-actuated device that receives vacuum through a connecting line from the intake pipe of the engine.

A vacuum of approximately 370 mm Hg in the intake pipe is normally required for optimal combustion during deceleration operation of an automobile engine. However, this vacuum level is less than the normal idling vacuum of approximately 400 mm Hg so that, during idling, the throttle valve-controlling vacuum actuated device would tend to open the throttle slightly, and thereby increase the speed of the engine, if measures were not taken to prevent this from occurring. It is known from the German patent publication (DOS) No. 2,046,436 to cut off the intake vacuum to the vacuum-actuated device at low vehicle speeds. To this end the vacuum line leading from the intake pipe to the vacuum-actuated device is provided with an electromagnetically-actuated (solenoid) control valve which is switched as a function of vehicle speed by a relatively costly electronic circuit. In addition to the high cost of this arrangement, this known device has the disadvantage that, during operation of the vehicle at speeds close to the speed at which the control valve is switched, an undesirable multiplicity of control pulses act on the throttle flap due to repeated switching of the control valve.

Thus, it is an object of the present invention to provide control apparatus of the type described above which is distinguished by low manufacturing cost and faultless operation. It is assumed in this connection that the intake pipe vacuum is to be disconnected from the closing adjustment mechanism at defined operating states of the vehicle; namely, when the vehicle is standing with the engine switched off, when the vehicle is idling with the transmission in neutral, when the vehicle is operated in first gear, and when the vehicle clutch is disengaged.

SUMMARY OF THE INVENTION

In accordance with the invention, the electromagnetically-actuated (solenoid) valve, arranged in the vacuum line connecting the vacuum-actuated closing adjustment device with a source of vacuum, is controlled as a function of the gear shift position of the vehicle transmission. In addition, the solenoid valve may be controlled as a function of the position of the vehicle clutch. Such control results in an interruption of the vacuum applied to the closing adjustment device in all the operating states of the vehicle in which throttle valve actuation, and thereby intake pipe vacuum adjustment, is not required.

In accordance with a further characteristic of the invention, a time-delay relay is provided so that the position of the solenoid valve is allowed to change after a short (e.g., one second) delay. This time-delay relay permits short-duration operation of the vehicle in one of the aforementioned operating states—for example, changeover from one gear to another through the neutral shift position—without immediate closing of the solenoid valve.

In accordance with one exemplary embodiment of the invention, a series circuit may be provided to control the voltage supplied to the time-delay relay. This series circuit comprises a first switch which opens when the vehicle ignition switch is turned off and a second switch which opens when the transmission is placed in the neutral shift position. Instead of this second switch, or in addition thereto, the series circuit may include a third switch arranged to open when the first transmission gear is engaged.

In accordance with another exemplary embodiment of the invention, the series circuit acting on the time-delay relay comprises a first switch which opens when the vehicle ignition switch is turned off and a plurality of further switches connected in parallel and associated with the respective ones of the second and higher gear shift positions. Each of these parallel switches is arranged to close whenever its respective gear is engaged. This embodiment ensures that the time-delay relay, and thereby the solenoid valve for closing off the vacuum line, are switched when none of the gears above first is engaged.

Finally, in accordance with a still further embodiment of the invention, a switch which opens when the clutch is disengaged may be provided in series with the switches operated as a function of the gear shift positions. This arrangement suspends the operation of the throttle valve closing adjustment device in the event that the clutch pedal is depressed for extended periods of time, for example when the transmission is in gear and the engine is idling.

For a better understanding of the invention, together with other and further objects, reference is made to the following description, taken in conjunction with the accompanying drawings, and its scope will be pointed out in the appended claims.

DESCRIPTION OF THE PREFERRED EMBODIMENTS

Figure 1:
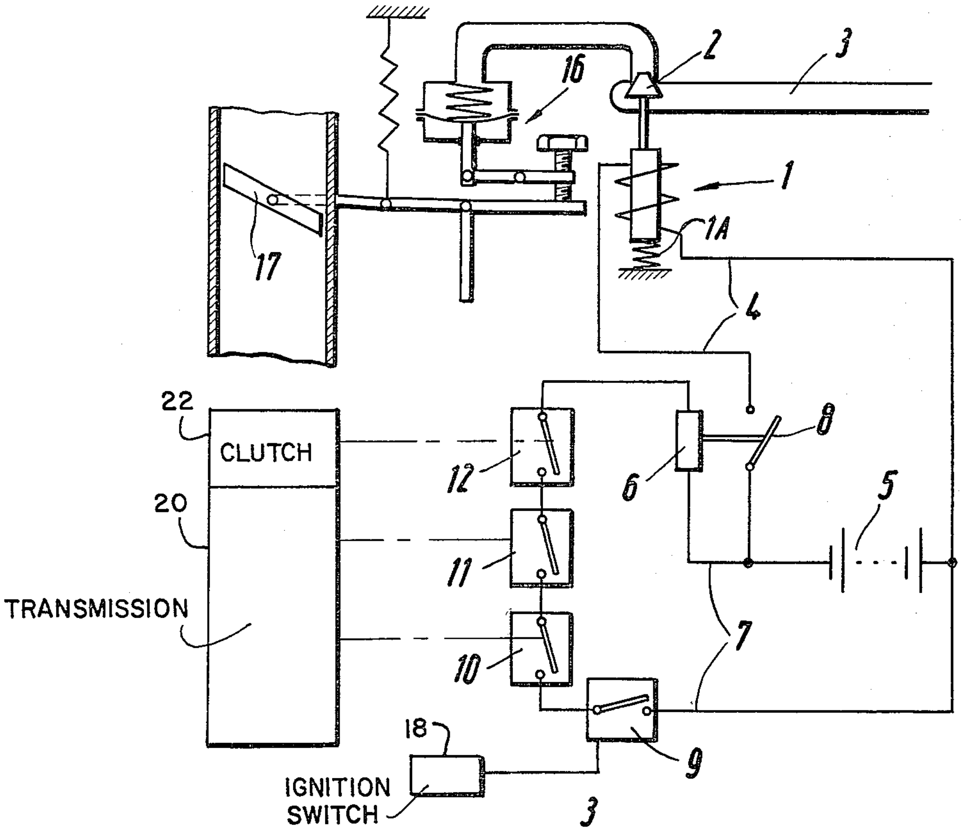
FIG. 1 shows the control apparatus in accordance with a first preferred embodiment of the invention in which the solenoid vacuum control valve is actuated as a function of the position of the first gear, the idling state, and the conditions of the clutch and ignition switch of the motor vehicle.
Figure 2:
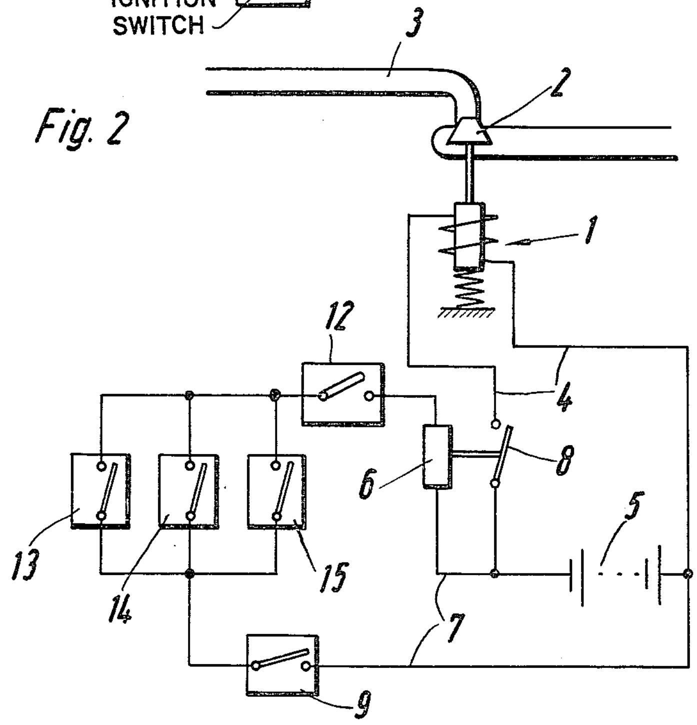
FIG. 2 shows another preferred embodiment wherein the solenoid valve is controlled as a function of the positions of the second, third and fourth gears, and the conditions of the clutch and ignition switch of the motor vehicle.

In both FIGS. 1 and 2 identical elements are designated by identical reference numerals. In the embodiment shown in FIG. 1 a solenoid-actuated control valve 1 has a valve body 2 arranged to close a vacuum line 3 leading from a tapping point of the intake pipe of a motor vehicle engine to a vacuum-actuated continually adjusting closing limitation device 16 for the carburetor throttle valve 17 whenever the circuit 4 controlling solenoid valve is interrupted. Solenoid valve 1 is normally closed by spring 1A. The circuit 4 is supplied voltage by a battery 5; that is, by the conventional vehicle storage battery. Interruption of the circuit 4 is effected by means of a time-delay relay 6 that is energized by a second circuit 7, whereby the relay contact 8 is opened when the circuit 7, likewise connected to the battery 5, is interrupted. Several switches 9–12, the positions of which are determined by the pertinent operating states of the motor vehicle equipped with the device, are connected into this second circuit 7.

The position of the switch 9 is dependent upon the position of the engine ignition switch 18 and it is open whenever the ignition switch is turned off. The position of the switch 10 depends upon the position of the first gear of the vehicle transmission; it is open whenever the first gear is engaged. The switch 11 is open whenever the transmission 20 is shifted into the neutral position and the switch 12, which depends upon the condition of the vehicle clutch 22, is open whenever the clutch is disengaged.

The four switches 9–12 in the second circuit 7 in FIG. 1 are connected in series so that the circuit is interrupted as long as one of these switches is open. Accordingly, the solenoid control valve 1 closes the vacuum line 3 whenever at least one of the following conditions is fulfilled: (1) the engine ignition 18 is turned off; (2) the transmission 20 is in neutral or in first gear; and (3) the vehicle clutch 22 is disengaged. In all these operating states of the motor vehicle, the interruption of the vacuum supply to the vacuum-actuated closing adjustment device 16 of the carburetor throttle valve 17 permits the throttle valve to close to its full idling position thereby avoiding any speed increase on idling.

In the embodiment shown in FIG. 2, there are provided, in place of the switches 10 and 11, three switches 13, 14 and 15 connected in parallel which represent the positions of the second, third and fourth gears, respectively. Each switch 13, 14 and 15 is closed whenever its associated gear is engaged. If desired, it is also possible to arrange in this circuit the switch 12, which depends on the position of the vehicle clutch 22, and/or the switch 9, which depends on the position of the ignition switch 18.

Because the solenoid control valve 1 is operated by way of the time-delay relay 6 in the embodiment shown in FIG. 2, the vacuum line 3 will be open only if the clutch 22 is engaged, the ignition is turned on and one of the three gears, two to four, is engaged; in other words, the vacuum line 3 will be closed whenever the transmission 20 is in first gear or in neutral.

The arrangement of the time-delay relay 6 in the two embodiments shown in the drawing serves to ensure that a momentary opening or closing of any one of the switches provided in the second circuit 7 does not lead to a corresponding actuation of the solenoid control valve 1. Accordingly, upon shifting, for example, from second to third or from third to fourth gear and during the simultaneous depression of the clutch 22, the valve body 2 of the solenoid control valve 1 will not immediately close the vacuum line 3.

While there have been described what are believed to be the preferred embodiments of the invention, those skilled in the art will recognize that various changes and modifications may be made thereto without departing from the spirit of the invention, and it is intended to claim all such embodiments as fall within the true scope of the invention.

I claim:

1. In a motor vehicle having an engine, an ignition switch, a manually-actuated clutch and a manually actuated transmission, said engine including an intake manifold and a carburetor with a throttle valve for controlling the supply of fuel-air mixture to said intake manifold by said carburetor, a device for continuously varying the closing limit of said carburetor throttle valve as a function of vacuum, which device makes said continually-varying-closing limit operation dependent upon discreet conditions of said ignition-switch, said clutch and said transmission, comprising:

vacuum-actuated means for continuously varying the closing limit of said throttle valve in dependence upon the vacuum applied thereto;

means for connecting said vacuum actuated means to said intake manifold thereby to provide variable vacuum pressure to said vacuum actuated means;

a valve in said connecting means for blocking said variable vacuum from said vacuum-actuated means so that said throttle valve is allowed to close to an idling speed position; and a means for actuating and closing said valve, said actuating means including switches activated in response to said discreet conditions and at least one time delay circuit for delaying operation of said actuating means until a selected time after activation of one of said switches, thereby maintaining said valve in an open condition during transient operation of said switches.

2. A device as described in claim 1, wherein said time delay circuit comprises a time delay relay having a delay period of at least 1 second.

3. A device as described in claim 2, wherein said time-delay relay is responsive to a second electrical circuit which includes said switches, said switches including a first switch arranged to open for the discreet condition comprising an open ignition switch and a second switch arranged to open for the discreet condition comprising said transmission being in neutral, said first and said second switch being connected in series to provide voltage to said time-delay relay when closed.

4. A device as described in claim 2, wherein said time-delay relay is responsive to a second electrical circuit which includes said switches, said switches including a first switch arranged to open for the discreet condition comprising an open ignition switch and a second switch is arranged to open for the discreet condition comprising said clutch being disengaged, said first and second switches being connected in series to provide voltage to said time-delay relay when closed.

5. A device as described in claim 2, wherein said time-delay relay is responsive to a second electrical circuit which includes said switches, said switches including a first switch arranged to open for the discreet condition comprising an open ignition switch, a second switch arranged to open for the discreet condition comprising said transmission being in neutral position, a third switch arranged to open for the discreet condition comprising said transmission being in first gear and a fourth switch arranged to open for the discreet condition comprising said clutch being disengaged, said first, second, third and fourth switches being connected in series to provide voltage to said time-delay relay when closed.

6. A device as described in claim 2, wherein said time-delay-relay is responsive to a second electrical circuit which includes a first switch arranged to open for the discreet condition comprising an open ignition switch and a plurality of further switches, each associated respectively with a gear shift position of second gear or higher, which are connected in parallel with each other and are arranged to close when said transmission is in second gear or higher so that when said transmission is in one of the discreet conditions of first gear and neutral, said parallel switches being connected in series with said first switch to provide a voltage to said time-delay-relay when said first switch and any one of said parallel switches is closed.

7. A device as described in claim 6, wherein said second electrical circuit includes an additional switch arranged to open for the discreet condition of said clutch being disengaged, said additional switch being connected in series with said first switch and said parallel switches to provide a voltage to said time-delay-relay when said first switch and said additional switch and any one of said parallel switches are closed.

* * * * *

UNITED STATES PATENT AND TRADEMARK OFFICE
CERTIFICATE OF CORRECTION

PATENT NO. : 4,290,323
DATED : September 22, 1981
INVENTOR(S) : Reinhard Gospodar It is certified that error appears in the above—identified patent and that said Letters Patent is hereby corrected as shown below:

First page, following Item 76, insert --[73] Assignee: Volkswagenwerk AG, Wolfsburg, Federal Republic of Germany--

Signed and Sealed this

*Fifteenth* Day of *June 1982*

[SEAL]

*Attest:*

GERALD J. MOSSINGHOFF

*Attesting Officer* *Commissioner of Patents and Trademarks*